United States Patent
Nishimura et al.

(10) Patent No.: US 6,949,606 B1
(45) Date of Patent: *Sep. 27, 2005

(54) CROSSLINKABLE RUBBER COMPOSITION

(75) Inventors: Koichi Nishimura, Kawasaki (JP); Toshio Ohkawa, Kawasaki (JP); Hideo Fukuda, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,335

(22) PCT Filed: Jan. 26, 2000

(86) PCT No.: PCT/JP00/00375

§ 371 (c)(1),
(2), (4) Date: Nov. 30, 2001

(87) PCT Pub. No.: WO00/44827

PCT Pub. Date: Aug. 3, 2000

(30) Foreign Application Priority Data

Jan. 26, 1999 (JP) .................................... 11-17582

(51) Int. Cl.⁷ ............................................ C08L 41/00
(52) U.S. Cl. ..................................... 525/208; 525/233
(58) Field of Search .............................. 525/208, 233

(56) References Cited

U.S. PATENT DOCUMENTS

| 3,351,517 A | | 11/1967 | Willis |
| 3,639,651 A | | 2/1972 | Komuro et al. |
| 3,657,393 A | * | 4/1972 | Komuro ..................... 525/187 |
| 4,048,261 A | * | 9/1977 | Starmer ..................... 525/187 |
| 5,447,992 A | | 9/1995 | Horvath |
| 5,733,235 A | | 3/1998 | Waku et al. |
| 6,500,884 B1 | * | 12/2002 | Tsujimura et al. ............ 524/83 |

FOREIGN PATENT DOCUMENTS

| GB | 1400800 | | 7/1975 |
| JP | 49-013251 | | 2/1974 |
| JP | 50-004032 | | 2/1975 |
| JP | 55-125155 | | 9/1980 |
| JP | 60141739 | * | 7/1985 |
| JP | 09-309975 | | 12/1997 |
| JP | 10-264314 | | 10/1998 |

OTHER PUBLICATIONS

T. Whelan, Polymer Technology Dictionary, Chapman & Hall, First Edition, 1994, p. 270.*

* cited by examiner

Primary Examiner—James J. Seidleck
Assistant Examiner—Irina S. Zemel
(74) Attorney, Agent, or Firm—Armstrong, Kratz, Quintos, Hanson & Brooks, LLP

(57) ABSTRACT

A rubber composition comprising a combination of a nitrile rubber and an epihalohydrin rubber is cross-linked to give a crosslinked product, by using at least two kinds of crosslinking agents selected from a sulfur-containing crosslinking agent, a mercaptotriazine crosslinking agent and a 2,3-dimercaptoquinoxaline crosslinking agent.

11 Claims, No Drawings

CROSSLINKABLE RUBBER COMPOSITION

TECHNICAL FIELD

This invention relates to a crosslinkable rubber composition giving a crosslinked product having good ozone resistance, and comprising, as rubber ingredient, a nitrile rubber and an epihalohydrin rubber, and, as crosslinking agent, at least two kinds of crosslinking agents selected from a sulfur-containing crosslinking agent, a mercaptotriazine crosslinking agent and a 2,3-dimercaptoquinoxaline crosslinking agent.

BACKGROUND ART

A blend (usually referred to as "polyblend") of an acrylonitrile-butadiene copolymer rubber (NBR) with a vinyl chloride resin (PVC) has heretofore been used as a material for producing a crosslinked rubber product for which an oil resistance and an ozone resistance are required. However, when PVC is incinerated, dioxin which is a pathocrinia substance is produced unless the incineration temperature is carefully and precisely controlled. Therefore incineration of PVC is avoided and the demand for PVC is diminishing.

As a substitute material for the polyblend which has good oil resistance and ozone resistance, a blend of NER with an epthalohydrin rubber is known. NBR and an epihalohydrin rubber exhibit different crosslinking mechanisms and thus the rubber blend is impossible to crosslink with a single crosslinking agent. Attempts for co-crosslinking the two rubbers by using a combination of crosslinking agents which are effective for crosslinking the respective rubbers have been made.

For example, a method of co-crosslinking a blend of a diene elastomer and an epihalohydrin polymer was proposed wherein an organic polysulfide, which is a sulfur-donating compound capable of crosslinking a diene rubber, and 2-mercaptoimidazoline or thiourea, which is a crosslinking agent for an epihalohydrin polymer, and an oxide of magnesium, calcium, zinc or lead are incorporated together in the blend (Japanese Examined Patent Publication No. S50-4032). However, where an oxide of magnesium, calcium or zinc is incorporated, the resulting co-crosslinked product has poor thermal aging resistance and dry physical properties, especially tensile strength, and the rate of crosslinking for the production thereof is low and the productivity is poor. Lead oxide is toxic and its use is restricted. Therefore the above-proposed method of co-crosslinking diene elastomer/epihalohydrin polymer has poor practical use.

An attempt of co-crosslinking a blend of NBR and epihalohydrin rubber was made wherein sulfur as a crosslinking agent and tetramethylthiuram monosulfide or benzothiazolyl disulfide as a crosslinking accelerator are used in combination. But, the crosslinked product has poor ozone resistance.

DISCLOSURE OF THE INVENTION

An object of the present invention is to provide a crosslikable rubber composition which is capable of giving a crosslinked product exhibiting improved oil resistance and ozone resistance, as a substitute material for the conventional polyblend.

The present inventors made extensive researches to achieve the above-mentioned object and found that a blend of nitrile rubber and an epihalohydrin rubber can be co-crosslinked by using at least two kinds of crosslinking agents selected from a sulfur-containing crosslinking agent, a mercaptotriazine crosslinking agent and a 2,3-dimercaptoquinoxaline crosslinking agent, to give a crosslinked product exhibiting improved oil resistance and ozone resistance.

Thus, in accordance with the present invention, there is provided a crosslinkable, rubber composition comprising, as rubber ingredient, a nitrile rubber and an epihalohydrin rubber, and, as crosslinking agent, at least two kinds of crosslinking agents selected from a sulfur-containing crosslinking agent, a mercaptotriazine crosslinking agent and a 2,3-dimercaptoquinoxaline crosslinking agent; and further there is provided a crosslinked product.

BEST MODE FOR CARRYING OUT THE INVENTION

[Crosslinkable Rubber Composition]

The crosslinkable rubber composition of the present invention comprises, as rubber ingredient, a nitrile rubber and an epihalohydrin rubber, and, as crosslinking agent, at least two kinds of crosslinking agents selected from a sulfur-containing crosslinking agent, a mercaptotriazine crosslinking agent and a 2,3-dimercaptoquinoxaline crosslinking agent.

Rubber Ingredient

The rubber ingredient used in the present invention is a combination of a nitrile rubber and an epihalohydrin rubber.

(i) Nitrile Rubber

Nitrile rubber contained in the rubber ingredient used in the present invention is prepared by copolymerizing an unsaturated nitrile compound such as acrylonitrile and methacrylonitrile, with at least one conjugated diene monomer such as 2-methyl-1,3-butadiene, 1,3-butadiene, 1,3-pentadiene and 2-chloro-1,3-butadiene. If desired, at least one monomer copolymerizable with the unsaturated nitrile compound and conjugated diene monomer may be further copolymerized. Such copolymerizable monomers include, for example, unsaturated carboxylic acids such as acrylic acid, methacrylic acid, maleic acid, fumaric acid and itaconic acid; acrylic acid esters and methacrylic acid esters, such as methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, glycidyl acrylate, glycidyl methacrylate, 2-hydroxyethyl acrylate and 2-hydroxypropyl methacrylate; and acrylic acid amides, methacrylic acid amides and their derivatives, such as acrylamide, methacrylamide, N-methylolacrylamide, N-methylolmethacrylamide, N-butoxymethylacrylamide and N-butoxymethylmethacrylamide. The content of the copolymerizable monomer units in the copolymer is preferably in the range of 0.1 to 15% by weight. A preferable nitrile rubber is an acrylonitrile-butadiene copolymer rubber (NBR).

The amount of the unsaturated nitrile compound (usually referred to as "amount of bound unsaturated nitrile") in the nitrile rubber is not particularly limited, but is preferably in the range of 10 to 55% by weight. The amount is appropriately chosen so that the performances required for the crosslinked product, such as oil resistance and cold resistance, are satisfied.

The nitrile rubber preferably has a Mooney viscosity ($ML_{1+4}$, 100° C.) in the range of 25 to 140, more preferably 45 to 90.

(ii) Epihalohydrin Rubber

Epihalohydrin rubber contained in the rubber ingredient used in the present invention includes a homopolymer of epihalohydrin such as epichlorohydrin or epibromohydrin, a copolymer of different kinds of epihalohydrin, and a copolymer of epihalohydrin and a copolymerizable monomer. The copolymerizable monomer includes, for example, alkylene oxides such as ethylene oxide, propylene oxide and butylene oxide; and unsaturated epoxides such as allyl glycidyl ether, glycidyl acrylate, glycidyl methacrylate, butadiene monoxide and vinylhexene monoxide. These copolymerizable monomers may be used as a combination of at least two thereof. As preferable examples of the copolymer of epihalohydrin with a copolymerizable monomer or monomers, there can be mentioned epihalohydrin (100–50% by mole)-ethylene oxide (0–50% by mole) copolymers, epihalohydrin (10–60% by mole)-ethylene oxide (0–50% by mole)-propylene oxide (0–30% by mole) terpolymers, epihalohydrin (90–70% by mole)-allyl glycidyl ether (10–30% by mole) copolymers, and epichlorohydrin (40–80% by mole)-ethylene oxide (50–20% by mole)-allyl glycidyl ether (2–20% by mole) terpolymers.

The epihalohydrin rubber preferably has a Mooney viscosity ($ML_{1+4}$, 100° C.) in the range of 30 to 140, more preferably 50 to 80.

(iii) Other Rubbers

If desired, the rubber ingredient used in the present invention may contain rubbers other than the above-mentioned nitrile rubber and epihalohydrin rubber, provided that the characteristics of the crosslinkable rubber composition and the crosslinked product are not banefully influenced. Such optional rubbers include, example, natural rubber, polybutadiene rubber, polyisoprene rubber, styrene-butadiene rubber, chloroprene rubber and acrylic rubber.

(iv) Proportion of Rubbers

Optimum proportion of the nitrile rubber and the epihalohydrin rubber is determined depending upon the properties desired for the crosslinked product of the present invention, such as oil resistance ozone resistance. The amount of the nitrile rubber is preferably in the range of 20 to 80% by weight, more preferably 50 to 70% by weight, based on the total weight of the rubber ingredient. The amount of the epihalohydrin rubber is preferably in the range of 80 to 20% by weight, more preferably 50 to 30% by weight, based on the total weight of the rubber ingredient. The amount of optional rubbers is such that the characteristics of the crosslinkable rubber composition of the present invention and the crosslinked product of the present invention are not deteriorated, and is preferably not larger than 50% by weight, more preferably not larger than 30% by weight and especially preferably not larger than 10% by weight, based on the total weight of the rubber ingredient.

Crosslinking Agent

The crosslinking agent used in the present invention is a combination of at least two kinds of crosslinking agents selected from a sulfur-containing crosslinking agent, a mercaptotriazine crosslinking agent and a 2,3-dimercaptoquinoxaline crosslinking agent. By using at least two kinds of the specified crosslinking agents, the rubber ingredient used can be co-crosslinked to give a crosslinked product having excellent ozone resistance, as compared with a conventional product crosslinked by using each crosslinking agent alone.

(i) sulfur-Containing Crosslinking Agent

The sulfur-containing crosslinking agent used in the present invention has a function of crosslinking a nitrile rubber. The sulfur-containing crosslinking agent includes sulfur and sulfur-donating compounds. As specific examples of the sulfur-donating compounds, there can be mentioned thiuram compounds such as tetramethylthiuram disulfide, tatraethylthiuram disulfide and dipentamethylenethiuram tetrasulfide, and morpholine disulfide.

A crosslinking accelerator is preferably used in combination with the sulfur-containing crosslinking agent. Conventional crosslinking accelerators used in combination with sulfur-containing crosslinking agents for crosslinking diene rubbers can be used for crosslinking the rubber ingredient used in the present invention. As preferable examples of the crosslinking accelerator, there can be mentioned thiuram accelerators such as tetramethylthiuram monosulfide, tetramethylthiuram disulfide, tetraethylthiuram monosulfide and tetraethylthiuram disulfide; and thiazole accelerators such as benzothiazolyl disulfide, N-cyclohexyl-2-benzothiazole-sulfenamide and N-oxydiethylene-2-benzothiazole-sulfenamide. These crosslinking accelerators may be used either alone or as a combination of at least two thereof.

An accelerator activator can be used in combination with the crosslinking accelerator. The accelerator activator includes, for example, fatty acids such as stearic acid, oleic acid and lauric acid and their metal salts; metal oxides such as zinc oxide and magnesium oxide; metal hydroxides such as calcium hydroxide; and zinc carbonate. Of these, a combination of magnesium oxide and stearic acid is preferable because magnesium oxide functions as an acid acceptor as well as an accelerator activator for an epihalohydrin rubber when the crosslinkable rubber composition is crosslinked.

The amount of the sulfur-containing crosslinking agent is preferably in the range of 0.1 to 3 phr, more preferably 0.2 to 3 phr, and especially preferably 0.3 to 1.5 phr, as expressed as amount of sulfur. By the term "phr" used herein, we mean "parts by weight per hundred parts by weight of the rubber ingredient".

The amounts of the crosslinking accelerator and the accelerator activator are suitably determined depending upon the particular kinds thereof so that storage stability and crosslinking rate of a crosslinkable rubber composition and the properties required for a crosslinked product are attained. The amount of the crosslinking accelerator is preferably in the range of 0.5 to 5 phr. The amount of the accelerator activator is preferably in the range of 0.1 to 3 phr where it is stearic acid, and preferably in the range of 0.5 to 10 phr where it is magnesium oxide, which is relatively large because magnesium oxide functions as an acid acceptor in addition to an accelerator activator.

(ii) Mercaptotriazine Crosslinking Agent

The mercaptotriazine crosslinking agent used in the present invention includes dimercaptotriazine compounds and trimercaptotriazine compounds, both of which have a function of crosslinking an epihalohydrine rubber. As specific examples of the mercaptotriaizine crosslinking agent, there can be mentioned 2,4,6-trimercapto-s-triazine, 2-methyl-4,6-dimercapto-s-triazine, 2-methylamino-4,6-dimercapto-s-triazine and 2-diethylamino-4,6-dimercapto-s-triazine. Of these, 2,4,6-trimercapto-s-triazine is preferable because it is easily available.

The amount of the mercaptotriazine crosslinking agent is preferably in the range of 0.1 to 10 phr, more preferably 0.2 to 8 phr and especially preferably 0.5 to 3 phr.

An acid acceptor is preferably used in combination with the mercaotriazine crosslinking agent. In view of control of crosslinking rate and thermal stability of a crosslinked product, the acid acceptor preferably includes oxides, hydroxides, carbonates, carboxylic acid salts, silicyc acid salts, boric acid salts and phosphorous acid salts of metals of group II of the periodic table; oxides, basic carbonic acid salts, basic carboxylic acid salts, basic phosphorous acid salts, basic sulfurous acid salts and tribasic sulfuric acid salts of metals of group IVA of the periodic table; and hydrotalcites.

As specific examples of the acid acceptor, there can be mentioned magnesium oxide, magnesium hydroxide, barium hydroxide, magnesium carbonate, barium carbonate, quicklime, calcium hydroxide, calcium carbonate, calcium silicate, calcium stearate, zinc stearate, calcium phthalate, calcium phosphite, zinc oxide, tin oxide, litharge, dibasic lead phthalate, dibasic lead carbonate, tin stearate, basic lead phosphite, basic tin phosphite, basic lead sulfite and tribasic lead sulfate. Of these, magnesium oxide is preferable in view of the crosslinking performance and properties of a crosslinked product.

Hydrotalcites are compounds represented by the formula: $Mg_xAl_y(OH)_{2x+3y-2}CO_3 \cdot wH_2O$ wherein x is an integer of 1 to 10, y is an integer of 1 to 5 and w is a positive number. As specific examples of the hydrotalcites, there can be mentioned $Mg_{4.5}Al_2(OH)_{13}CO_3 \cdot 3.5H_2O$. $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$. $Mg_5Al_2(OH)_{14}CO_3 \cdot 4H_2O$ and $Mg_3Al_2(OH)_{10}CO_3 \cdot 1.7H_2O$.

The amount of the acid acceptor is preferbly in the range of 1 to 10 phr.

A crosslinking accelerator can be used in combination with the mercaptotriazine crosslinking agent, which includes organic bases having a dissociation constant PKa (as defined in Mujio Kotake, Dai-Yuki-Kagaku, separate volume 2 [Manual of Constants in Organic Chemistry], p585–613, published by Asakura Shoten) of at least 7. As specific examples of the organic bases, there can be mentioned monofunctional amines which include strong bases such as laurylamine, guanidine, diphenylguanidine, diortho-tolylguanidine, piperidine and pyrrolidine, and ultra-strong bases such as 1,8-diaza-bicyclo(5,4,0)undcene-7 (hereinafter abbreviated to "DBU"). The crosslinking accelerator further includes primary, secondary and tertiary aliphatic amines, dibenzylamine, benzylamine and N-methylmorpholine. Of these, diphenylguanidine having a low volatility and bases having PKa of at least 10 are preferable. Compounds capable of producing the organic bases having a PKa of at least 7 can also be used as the crosslinking accelerator, which include, for example, basic salts such as carbonic acid salt, phenol salts, hydrochloric acid salts, sulfuric acid salts and oxalic acid salts of the organic bases; and sodium salt, zinc salt, copper salt, lead salt and piperidine salt of dithiocarbamic acid.

A crosslinking retardant can also be used, such as N-cyclohexylthiophthalimde.

The amounts of the crosslinking accelerator and the crosslinking retardant are appropriately determined depending upon the particular kinds thereof, and preferably in the range of 0.1 to 10 phr, more preferably 0.3 to 5 phr.

A crosslinking aid can also be used in combination with the organic base crosslinking accelerator. The crosslinking aid includes oxides of metals of group IIA and group IIB of the periodic table, such as calcium oxide, magnesium oxide and zinc oxide.

(iii) 2,3-dimercaptoquinoxaline Crosslinking Agent

The 2,3-dimercaptoquinoxaline crosslinking agent used in the present invention is a compound represented by the following general formula:

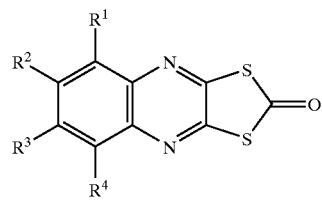

wherein each of $R^1$ through $R^4$ independently represents a hydrogen atom or $C_1$–$C_4$ alkyl group.

As specific examples of the 2,3-dimercaptoquinoxaline crosslinking agent, there: can be mentioned quinoxaline-2,3-dithiocarbonate, 6-methylquinoxaline-2,3-dithiocarbonate, 6-isopropylquinoxaline-2,3-dithiocarbonate and 5,8-dimethylquinoxaline-2,3-dithiocarbonate.

The amount of the 2,3-dimercaptoquinoxaline crosslinking agent is preferably in the range of 0.1 to 10 phr, more preferably 0.5 to 3 phr.

Where the 2,3-dimercaptoguinoxaline crosslinking agent is used, a crosslinking accelerator and a accelerator activator can also be used. The kind and amount of the crosslinking accelerator and a accelerator activator may be the same as those described above as for the mercaptotriazine crossslinking agent.

(iv) Proportion of Crosslinking Agents

The proportion of the crosslinking agents used may be appropriately chosen depending upon the particular combination of crosslinking agents. For example, (1) where the sulfur-containing crosslinking agent and the mercaptotriazine crosslinking agent are used in combination, the amount of the sulfur-containing crosslinking agent is preferably in the range of 0.1 to 5 parts by weight, more preferably 0.3 to 3 parts by weight, per 1 part by weight of the mercaptotriazine crosslinking agent; (2) where the sulfur-containing crosslinking agent and the 2,3-dimercaptoquinoxaline crosslinking agent are used in combination, the amount of the sulfur-containing crosslinking agent is preferably in the range of 0, 1 to 5 parts by weight, more preferably 0.3 to 3 parts by weight, per 1 part by weight of the 2,3-dimercaptoquinoxaline crosslinking agent, (3) where the mercaptotriazine crosslinking agent and the 2,3-dimercaptoquinoxaline crosslinking agent are used in combination, the amount of the mercaptotriazine crosslinking agent is preferably in the range of 0.2 to 5 parts by weight, preferably 0,5 to 3 parts by weight, per 1 part by weight of the 2,3-dimercaptoquinoxaline crosslinking agent; and (4) where the three kinds of crosslinking agents are used in combination, the amount of the mercaptotriazine crosslinking agent is preferably in the range of 0.2 to 5 parts by weight, preferably 0,5 to 3 parts by weight, per 1 part by weight of the 2,3-dimercaptoquinoxaline crosslinking agent, and the amount of the sulfur-containing crosslinking agent is preferably in the range of 0.1 to 5 parts by weight, more preferably 0.3 to 3 parts by weight, per 1 part by weight of the 2,3-dimercaptoquinoxaline crosslinking agent.

Other Ingredients

If desired, the crosslinkable rubber composition of the present invention may contain optional ingredients other than the above-described rubber ingredient, crosslinking agents, crosslinking accelerators and others, provided that the object and effect of the present invention are not banefully influenced. Such optional ingredients include, for example, reinforcing agents such as various types of carbon black, silica and clay; fillers such as calcium carbonate; plasticizers; processing aids; and antioxidants. The optional ingredients are not particularly limited and can be selected from those which have heretofore been used for NBR and an epihalohydrin rubber.

Mixing

The crosslinking agent of the present invention can be prepared by mixing or kneading together the above-specified rubber and crosslinking agents and other optional ingredients by using a mixing means such as a roll, a Banbury mixer and an internal mixer.

The manner and order in which the respective ingredients are mixed are not particularly limited. For example, (1) a nitrile rubber and a halohydrin rubber are blended, and then, crosslinking agents and other ingredients are mixedor kneaded together with the rubber blend; and (2) a crosslinking agent and other ingredients are mixed or kneaded together with each of a nitrile rubber and a halohydrin rubber, and then the two rubber compositions are mixed together.

Preferably, the rubber ingredient is first mixed with ingredients which are relatively difficult to react or thermally decompose under high temperature conditions, such as a reinforcing agent and a filler, and then, the resulting mixture is mixed with ingredients, which are relatively easy to react or thermally decompose under high temperature conditions, at a low temperature and within a short period of time.

[Crosslinked Rubber Product]

A rubber article comprised of a crosslinked rubber having excellent static and dynamic ozone resistance and oil resistance can be made from the crosslinkable rubber composition of the present invention.

(i) Molding Method and Crosslinking Method

The molding method and the cross inking method for making the crosslinked product from the crosslinkable rubber composition of the present invention are not particularly limited. The molding method and the crosslinking method can be conducted concurrently, or successively in this order, according to the molding method, the crosslinking method and the shape of the crosslinked product.

The lower limit of the crosslinking temperature for crosslinking the crosslinkable rubber composition is preferably 130° C., more preferably 140° C. The upper limit thereof is preferably 200° C. If the crosslinking temperature is too lows the crosslinking time is liable to be long and the crosslinking density tends to be lowered. In contrast, if the crosslinking temperature is too high, the crossslinking proceeds within a short time and defective moldings are liable to be produced.

The crosslinking time varies depending upon the particular crosslinking method, crosslinking temperature and shape of the crosslinked product, but is preferably in the range of 1 minute to 5 hours in view of the crosslinking density and the production efficiency.

The heating method may be appropriately chosen from those which are conventionally employed for crosslinking rubbers and which include press heating, steam heating, oven heating and hot air heating.

Use

The crosslinkable rubber composition of the present Invention is especially suitable as material for hoses such as a fuel hose, a lubricating oil hose and an air hose, and rubber rolls such as an office machine roll, a printing roll and paper-making roll.

(i) Hose

For the use of hoses, the crosslinkable rubber composition of the present invention is used as material for making a single layer hose, or for making an inner layer and/or an outer layer of a multi-layer hose.

Hoses are usually made by extruding rubber material through an extruder into a tubular form. However, a short hose can be made by using a mold, e.g., by injection molding or press molding. In a process of making a single layer hose, a single layer of the crosslinkable rubber composition is formed and, according to the need, a reinforcing layer comprised of a woven or knitted fabric is formed on the surface of the single rubber layer. In a process of making a multi-layer hose, for example, a single inner layer of the crosslinkable rubber composition is formed and, according to the need, a reinforcing layer is formed on the surface of the single inner rubber layer, and an outer rubber layer of the crosslinkable rubber composition is formed further on the reinforcing layer by using an extruder, and if desired another reinforcing layer is further formed on the outer rubber layer.

The thus-formed uncrosslinked rubber hose is subjected to crosslinking to give a hose as a crosslinked product by a method wherein it is heated with steam in a vulcanizer, or a method wherein it is cut into a predetermined length, a mandrel is inserted into the cut rubber hose, and the rubber hose is heated with steam in a vulcanizer.

(ii) Roll

For the use of a roll, the crosslinkable rubber composition of the present invention is used for the formation of a rubber layer of a roll.

When the roll has a small size, there can be adopted a method wherein the crosslinkable rubber composition is injected into a mold having a metal core rod placed therein, and then press curing is conducted, and a method wherein the crosslinkable rubber composition is extruded through an extruder into a tubular form, a core rod is inserted within the tubular extrudate, and the tubular extrudate is placed in a mold to conduct press curing.

When the roll has a large size, there can be adopted a method wherein the crosslinkable rubber composition in the form of sheet is wound around a metal core rod to a predetermined thickness, and then heated with steam in a vulcanizer to give a crosslinked rubber roll. When the sheet wound around the metal core rod is relatively soft, the wound sheet can be heated with steam in a vulcanizer, as it is, to give a crosslinked rubber roll. But, when the sheet wound around the metal core rod is relatively rigid, the wound sheet is rolled with, for example, a nylon wrapper, and then heated with steam in a vulcanizer to give a crosslinked rubber roll.

The crosslinked rubber roll is surface-polished or surface-treated to be thereby made into a finished article having desired appearance, shape and precision.

WORKING EXAMPLES

The invention will now be described in detail by the following working examples.

EXAMPLES 1–8 AND COMPARATIVE EXAMPLES 1–5

The following rubber ingredients were used.

(i) NBR (1): bound acrylonitrile content: 33.5% by weight, bound butadiene content: 66.5% by weight, Mooney viscosity ($ML_{1+4}$, 100° C.): 78, tradename "Nipol™ 1042" available from Zeon Corporation (ii) NBR (2): bound acrylonitrile content: 41.0% by weight, bound butadiene content: 59.0% by weight, Mooney viscosity (ML$_{1+4}$, 100° C.): 83, tradename "Nipol™ 1041" available from Zeon Corporation (iii) Epichlorohydrin rubber: epichlorohydrin-allyl glycidyl ether copolymer, bound epichlorohydrin content: 94% by weight, bound allyl glycidyl ether content: 6% by weight, Mooney viscosity (ML$_{1+4}$, 100° C.): 60, tradename "Gechron™ 1100" available from Zeon Corporation (iv) Polyblend: mixture of 70 parts by weight of NER (bound acrylonitrile content: 33.5% by weight, tradename "Nipol™ 1203" available from Zeon Corporation) and 30 parts by weight of polyvinyl chloride.

According to the recipe shown in Tables 1, rubber ingredients were mixed together with ingredients other than the crosslinking agents, crosslinking accelerator and accelerator activator by using a 0.8 liter Banbury mixer at a preset temperature of 100° C., and then, the resulting mixture was mixed together with the crosslinking agents, crosslinking accelerator and accelerator activator at a preset temperature of 50° C. to prepare a crosslinkable composition.

The ingredients used were as follows.

(i) FEF carbon black: average particle diameter: 51 μm, specific surface area: 58 m²/g, pH value: 7.7, tradename "Asahi #60" available from Asahi Carbon K.K.

(ii) SRF carbon black: average particle diameter: 58–94 μm, specific surface area: 25–30 m²/g, pH value: 7.5–9.0, tradename "Seast™ F" available from Tokai Carbon K.K.

(iii) Clay: specific gravity; 2.62, hard clay, 99.8% passing through sieve with 325 mesh size, tradename "Dixie Clay™" available from R. T. Vanderbilt Co.

(iv) Calcium carbonate: fatty acid-treated product, average particle diameter: 0.04 μm, specific surface area: 30–32 m²/g, specific gravity: 2.55–2.57, pH value: 8.7–9, CaO content: 54.1% by weight, tradename "Hakuennka CC" available from Shiraishi Kogyo K.K.

(v) Magnesium oxide: MgO content: 97.5 by weight, apparent specific gravity 0.25–0.35 g/ml, specific surface area (BET): 60–100 m²/g, tradename "Kyowamag™ 100" available from Kyowa Kagaku Kogyo K.K.

(vi) Lead oxide: #1 lead oxide made by French method, tradename "zinc flower #1" available from Sakai Chem. Ind. Co.

(vii) Sulfur: passing through sieve with mesh size 325, tradename "Kinka-mark fine sulfur" available from Tsurumi Kagaku Kogyo K.K.

(viii) 2-ethylhexyl phthalate: Daihachi Kagaku K.K.

(ix) Tetramethylthiuram disulfide: tradename "Nocceler™ TT" available from Ohuchi Shinko kagaku Kogyo K.K.

(x) N-cyclohexyl-2-benzothiazylsulfenamide, tradename "Nocceler™ CZ" available from Ohuchi Shinko kagaku Kogyo K.K.

(xi) 2,4,6-trimercapto-s-triazine; tradename "Zisnet-F™" Sankyo Kaset K.K.

(xiii) 6-methylquinoxaline-2,3-dithiocarbamate: tradename "DAISONET™ XL-21" available from Daiso K.K.

(xiii) DBU salt: DBU salt of phenol-novolak resin, DBU contents 30% by weight, tradename "U-CAT™ SA 841" available from Sun Avot Co.

Each crosslinkable rubber composition was press-cured at 160° C. for 30 minutes (in working examples other than Comparative Example 5) or 15 minutes (in Comparative Example 53) to prepare a crosslinked rubber sheet having a thickness of 2 mm. Mechanical properties (tensile test) and static and dynamic ozone resistance of the crosslinked rubber sheet were evaluated according to JIS K6301.

Static ozone resistance was determined by a method wherein a specimen drawn by 20% was exposed to an atmosphere having an ozone concentration of 50 pphm at a temperature of 40° C. State of crack occurrence was observed after a stated period of time elapsed. Dynamic ozone resistance was determined by the same method as the above-mentioned method for evaluation of static ozone resistance, except that the crack occurrence state was observed while a specimen was repeatedly drawn at an elongation of 0 to 30%. In Table 1 and Table 2, "NC" means that crack did not occur, and other denotations such as "A2" and "B3" means states of crack occurrence as expressed according to JIS K6301. In Table 2, "broken" means that cracks occurred and further the specimen was broken. Denotation "—" means that a specimen was broken at the previous observation and thus was not observed. Denotation "NM" means that a specimen exhibited a too large permanent set and thus the crack occurrence state could not be evaluated under the specified conditions.

In the tensile test, denotation "TB" means tensile strength at break, "EB" means elongation at break, "M$_{100}$" means modulus at 100% elongation, and "HS" means hardness as measured according to JIS method A.

Permanent set was measured according JIS K6301. Rubber having a too large permanent set has no practical use. In general, it is said that rubber having a permanent set not larger than 10% has a practical use. A specimen having a too large permanent set is not suitable for evaluation of its ozone resistance wherein measurement is conducted on a specimen having a predetermined elongation given thereto.

Evaluation results of the above-mentioned properties are shown in Table 1 and Table 2.

TABLE 1

| | Examples | | | | | | | |
|---|---|---|---|---|---|---|---|---|
| | 1 | 2 | 3 | 4 | 5 | 6 | 7 | 8 |
| Ingredients (weight parts) Rubber ingredient | | | | | | | | |
| NBR (1) | 60 | 70 | 60 | 60 | — | — | — | 60 |
| NBR (2) | — | — | — | — | 60 | 70 | 60 | — |
| Epichlorohydrin rubber | 40 | 30 | 40 | 40 | 40 | 30 | 40 | 40 |
| Crosslinking agent | | | | | | | | |
| Sulfur | 0.5 | 0.5 | 0.5 | — | 0.3 | 0.3 | 0.3 | 0.3 |
| 2,4,6-Trimercapto-s-triazine | 1 | 1. | — | 1 | 3 | 3 | — | 0.6 |
| 6-Methylquinoxaline-2,3-dithiocarbamate | — | — | 1.5 | 1.5 | — | — | 1.5 | 0.9 |

TABLE 1-continued

|  | Examples | | | | | | | |
|---|---|---|---|---|---|---|---|---|
|  | 1 | 2 | 3 | 4 | 5 | 6 | 7 | 8 |
| Crosslinking accelerator | | | | | | | | |
| Ttetramethylthiuram disulfide | 1 | 1 | 1 | — | 1 | 1 | 1 | 0.6 |
| N-cyclohexyl-2-benzo-thiazylsulfenamide | 1 | 1 | 1 | — | 1 | 1 | 1 | 0.6 |
| DBU salt | — | — | — | — | — | — | 1 | — |
| Accelerator activator | | | | | | | | |
| Magnesium oxide | 3 | 3 | 3 | 3 | 3 | 3 | 3 | 3 |
| Stearic acid | 1 | 1 | 1 | 1 | 1 | 1 | 1 | 1 |
| 2-ethylhexyl phthalate | — | — | — | — | 40 | 40 | 40 | — |
| Other ingredients | | | | | | | | |
| Calcium carbonate | 5 | 5 | 5 | 5 | 5 | 5 | 5 | 5 |
| FEF carbon black | 50 | 50 | 50 | 50 | 80 | 80 | 80 | 40 |
| Clay | — | — | — | — | 30 | 30 | 30 | — |
| Dry physical properties | | | | | | | | |
| TB (MPa) | 20.4 | 23.0 | 21.7 | 21.1 | 13.9 | 15.5 | 13.2 | 21.3 |
| EB (%) | 350 | 370 | 420 | 430 | 280 | 310 | 330 | 320 |
| $M_{10C}$ (MPa) | 5.68 | 5.39 | 4.7 | 3.63 | 6.47 | 5.29 | 4.7 | 5.83 |
| HS | 73 | 72 | 70 | 68 | 72 | 70 | 69 | 74 |
| Permanent set (%) | 2.4 | 2.9 | 6.3 | 6.8 | 5.8 | 8.8 | 10.3 | 2.2 |
| Static ozone resistance | | | | | | | | |
| 24 hours | NC | NC | NC | NC | NC | NC | NC | NC |
| 72 hours | NC | NC | NC | NC | NC | NC | NC | NC |
| 168 hours | NC | NC | NC | NC | NC | NC | NC | NC |
| Dynamic ozone resistance | | | | | | | | |
| 24 hours | NC | NC | NC | NC | NC | NC | NC | NC |
| 72 hours | NC | NC | NC | NC | NC | NC | NC | NC |
| 168 hours | NC | NC | NC | NC | NC | NC | NC | NC |

TABLE 2

| Ingredients (weight parts) | Comparative Examples | | | | |
|---|---|---|---|---|---|
|  | 1 | 2 | 3 | 4 | 5 |
| Rubber ingredient | | | | | |
| NBR (1) | 60 | 60 | 60 | — | — |
| NBR (2) | — | — | — | 60 | — |
| Epichlorohydrin rubber | 40 | 40 | 40 | 40 | — |
| Polyblend | — | — | — | — | 100 |
| Crosslinking agent | | | | | |
| Sulfur | 0.5 | — | — | 0.3 | 0.5 |
| 2,4,6-Trimercapto-s-triazine | — | 1 | — | — | — |
| 6-Methylquinoxaline-2,3-dithiocarbamate | — | — | 1.5 | — | — |
| Crosslinking accelerator | | | | | |
| Ttetramethylthiuram disulfide | 1 | — | — | 1 | 1.5 |
| N-cyclohexyl-2-benzo-thiazylsulfenamide | 1 | — | — | 1 | 1.5 |
| Accelerator activator | | | | | |
| Magnesium oxide | 3 | 3 | 3 | 3 | — |
| Zinc oxide | — | — | — | — | 5 |
| Stearic acid | 1 | 1 | 1 | 1 | 1 |
| 2-Ethylhexyl phthalate | — | — | — | 40 | 20 |
| Other ingredients | | | | | |
| Calcium carbonate | 5 | 5 | 5 | 5 | — |
| FEF carbon black | 50 | 50 | 50 | 50 | — |
| SRF carbon black | — | — | — | — | 60 |
| Clay | — | — | — | 30 | — |
| Dry physical properties | | | | | |
| TB (MPa) | 19.8 | 13.8 | 12.9 | 14.5 | 14.5 |
| EB (%) | 480 | 810 | 830 | 410 | 470 |
| $M_{100}$ (MPa) | 2.94 | 2.45 | 2.54 | 5.68 | 4.7 |
| HS | 66 | 68 | 67 | 71 | 70 |
| Permanent set (%) | 7.2 | 25.5 | 26.3 | 8.6 | 8.3 |
| Static ozone resistance 24 hours | C3 | NM | NM | B3 | NC |
| Static ozone resistance 72 hours | Broken | NM | NM | C3 | NC |
| Static ozone resistance 168 hours | — | NM | NM | Broken | NC |
| Dynamic ozone resistance 24 hours | B3 | NM | NM | B4 | NC |
| Dynamic ozone resistance 72 hours | B4 | NM | NM | Broken | A2 |
| Dynamic ozone resistance 168 hours | Broken | NM | NM | — | Broken |

In Comparative Examples 1 to 4, crosslinkable rubber compositions each having one kind of crosslinking agent were prepared, their crosslinked products were made and their properties were evaluated. In Comparative Example 5, a crosslinkable rubber composition having a conventional polyblend was prepared, its crosslinked product was made and its properties were evaluated. Crosslinked products made in Comparative Examples 1 to 4 have a too large permanent set or poor static and dynamic ozone resistances, as compared with the crosslinked product having a conventional polyblend made in Comparative Example 5.

In Examples 1 to 8, crosslinkable rubber compositions of the present invention were prepared, their crosslinked products were made and their properties were evaluated. As seen from the evaluation results, the crosslinked products exhibit approximately the same permanent set and static ozone resistance and improved dynamic ozone resistance, as compared with the crosslinked product having a conventional polyblend made in Comparative Example 5.

INDUSTRIAL APPLICABILITY

The crosslinkable rubber composition of the present invention gives a crosslinked product exhibiting approximately the same permanent set and static ozone resistance and much improved dynamic ozone resistance, as compared with a crosslinked product having a conventional NBR/PVC polyblend. Therefore, the crosslinkable rubber composition is suitable as material for making rolls and hoses.

What is claimed is:

1. A crosslinkable rubber composition comprising, as rubber ingredient, a nitrile rubber and an epihalohydrin rubber and, as crosslinking agent, at least two kinds of crosslinking agents selected from a sulfur-containing crosslinking agent, a mercaptotriazine crosslinking agent and a 2,3-dimercaptoquinoxaline crosslinking agent.

2. The crosslinkable rubber composition according to claim 1, wherein the sulfur-containing crosslinking agent and the mercaptotriazine crosslinking agent are contained in combination in amounts of 0.1 to 3 phr as the amount of sulfur, and 0.1 to 10 phr, respectively.

3. The crosslinkable rubber composition according to claim 2, wherein the amount of the sulfur-containing crosslinking agent is in the range of 0.1 to 5 parts by weight per 1 part by weight of the mercaptotriazine crosslinking agent.

4. The crosslinkable rubber composition according to claim 1, wherein the sulfur-containing crosslinking agent and the 2,3-dimercaptoquinoxaline crosslinking agent are contained in combination in an amount of 0.1 to 3 phr as the amount of sulfur, and an amount of 0.1 to 10 phr, respectively.

5. The crosslinkable rubber composition according to claim 4, wherein the amount of the sulfur-containing crosslinking agent is in the range of 0.1 to 5 parts by weight per 1 part by weight of the 2,3-dimercaptoquinoxaline crosslinking agent.

6. The crosslinkable rubber composition according to claim 1, wherein the 2,3-dimercaptoquinoxaline crosslinking agent and the mercaptotriazine crosslinking agent are contained in combination in amounts of 0.1 to 10 phr and 0.1 to 10 phr, respectively.

7. The crosslinkable rubber composition according to claim 6, wherein the amount of the meroaptotriazine crosslinking agent is in the range of 0.2 to 5 parts by weight per 1 part weight of the 2,3-dimercaptoquinoxaline crosslinking agent.

8. The crosslinkable rubber composition according to claim 1, wherein the amounts of the nitrile rubber and the epihalohydrin rubber are 20 to 80% by weight and 80 to 20% by weight, respectively, based on the total weight of the rubber ingredient.

9. A crosslinked product obtained by crosslinking a crosslinkable rubber composition as claimed in claim 1.

10. The crosslinked product according to claim 9, which is a hose.

11. The crosslinked product according to claim 9, which is a roll.

* * * * *